(12) United States Patent
Anselment et al.

(10) Patent No.: US 8,496,173 B2
(45) Date of Patent: Jul. 30, 2013

(54) CAMERA-BASED CODE READER AND METHOD FOR ITS ADJUSTED MANUFACTURING

(75) Inventors: Christoph Anselment, Waldkirch (DE); Ralf Ulrich Nübling, Denzlingen (DE)

(73) Assignee: Sick AG, Waldkirch (DE)

( * ) Notice: Subject to any disclaimer, the term of this patent is extended or adjusted under 35 U.S.C. 154(b) by 0 days.

(21) Appl. No.: 13/542,084

(22) Filed: Jul. 5, 2012

(65) Prior Publication Data
US 2013/0015244 A1    Jan. 17, 2013

(30) Foreign Application Priority Data
Jul. 11, 2011 (EP) ..................................... 11173483

(51) Int. Cl.
*G06K 7/10* (2006.01)
*G06K 7/00* (2006.01)
(52) U.S. Cl.
USPC ...................................... 235/440; 235/462.01
(58) Field of Classification Search
USPC .......... 235/440, 462, 462.01–462.45, 472.01, 235/472.02, 472.03
See application file for complete search history.

(56) References Cited

U.S. PATENT DOCUMENTS

| | | | | |
|---|---|---|---|---|
| 5,308,966 A | * | 5/1994 | Danielson et al. | 235/462.23 |
| 5,457,308 A | * | 10/1995 | Spitz et al. | 235/462.12 |
| 5,591,955 A | * | 1/1997 | Laser | 235/462.06 |
| 6,330,973 B1 | | 12/2001 | Bridgelall et al. | |
| 8,004,604 B2 | * | 8/2011 | Chaleff et al. | 348/376 |
| 2004/0232237 A1 | * | 11/2004 | Kasai et al. | 235/454 |
| 2007/0007439 A1 | * | 1/2007 | Nuebling | 250/216 |
| 2008/0310765 A1 | * | 12/2008 | Reichenbach et al. | 382/312 |
| 2011/0121076 A1 | * | 5/2011 | Hennick et al. | 235/454 |

FOREIGN PATENT DOCUMENTS

| | | | |
|---|---|---|---|
| EP | 1513094 | * | 6/2004 |
| EP | 1 513 094 B1 | | 3/2006 |
| EP | 1 507 228 B1 | | 4/2006 |
| EP | 1 742 168 A1 | | 1/2007 |
| EP | 1 814 058 A1 | | 8/2007 |
| EP | 1814058 | * | 8/2007 |
| EP | 1 698 995 B1 | | 1/2008 |

OTHER PUBLICATIONS

European Search Report issued on Dec. 23, 2011, in counterpart European Patent Application 11173483.6.

* cited by examiner

*Primary Examiner* — Thien M Le
(74) *Attorney, Agent, or Firm* — Nath, Goldberg & Meyer; Jerald L. Meyer; Scott L. Langford

(57) ABSTRACT

A camera-based code reader (10) has an image sensor comprising a line-shaped reading area (18) for capturing an image line, an illumination unit (28, 30) for illuminating the reading area (18), an evaluation unit (46) configured to compose an image from successively captured image lines, and a decoding unit (48) for locating and decoding code information in the image. The code reader (10) further comprises an elongated base body (26) with a plurality of individual image sensors (32) mounted thereon, each of the individual image sensors (32) comprising a line-shaped individual reading area (18a-d), and the individual image sensors (32) together forming the image sensor by being oriented and arranged relative to one another so that the individual reading areas (18a-d) overlap to form the line-shaped reading area (18).

23 Claims, 3 Drawing Sheets

CAMERA-BASED CODE READER AND METHOD FOR ITS ADJUSTED MANUFACTURING

Figure 1:
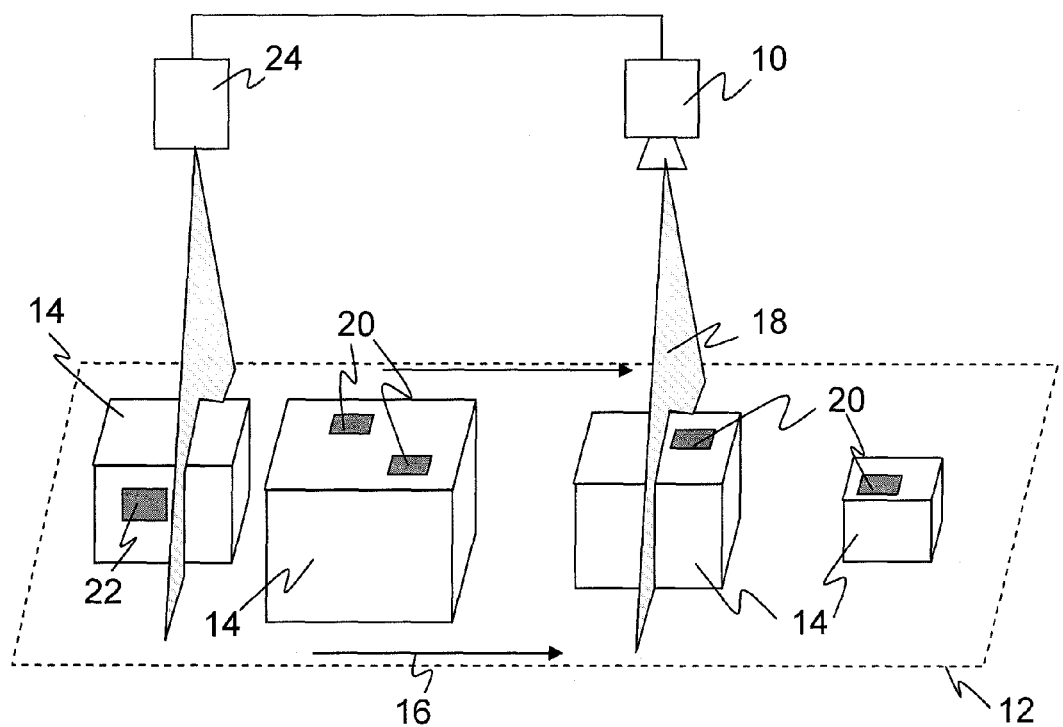

The invention relates to a camera-based code reader having an image sensor comprising a line-shaped reading area for capturing an image line and a method for manufacturing an adjusted camera-based code reader according to the preamble of claims 1 and 20, respectively.

The most common code readers are bar code scanners reading barcodes with a laser reading beam moving transverse to the code. These bar code scanners are often used at cashiers in supermarkets, for automatic package identification, sorting of mail, baggage handling in airports, and other logistics applications. With the advancement of digital camera technology, bar code scanners are more and more replaced by camera-based code readers. Instead of scanning code areas, a camera-based code reader captures an image of the objects bearing the codes by means of a CCD-Chip or a CMOS-Chip, and image evaluation software extracts the code information from these images. Camera-based code readers can easily handle other types of codes than one-dimensional bar codes, which can also be two-dimensional like a matrix code, and which provide more information.

In an important application, the objects bearing the codes are conveyed past the code reader. A line camera reads the object images containing the code information successively and line by line with the relative motion. For the objects to be arranged on the conveyor with arbitrary orientation, several code readers are often provided to capture objects from several sides or from all sides.

Since ambient light is rarely sufficient, or is even shielded in case of a reading tunnel, the reading area is additionally illuminated. A plurality of LEDs arranged in a line can be used for that purpose, the light of the LEDs being focussed by illumination optics onto the width of the line in its transverse direction, and being homogenized in its line direction. Such optics are for example known from EP 1 742 168 or EP 1 507 228.

There, it is necessary to align the receiver with respect to the illumination, and an interface between the camera unit and the illumination unit has to be provided.

Another requirement is the fast focussing of the reception optics of the line camera according to the object distance. Known solutions are described in EP 1 513 094 B1 and EP 1 698 995 B1, where an optical element is moved on a lever to adjust the optically effective back focal length or the focal length by pivoting the lever.

In an application of a code reader based on a line camera as described, where objects are moved on a conveyor belt through the reading area of the code reader, the line camera should be able to capture the entire width of the conveyor belt. This requires a high-resolution line-shaped receiver in the camera. These line-shaped receivers are very expensive and set a limit to the possible resolution. With conveyor belts increasing in width, the camera systems need to cover even larger reading areas.

These high-performance cameras having a high-resolution line-shaped receiver and a corresponding illumination as known in the art are also very complex to assemble, mount, and adjust. The fixed reading area can barely be adapted to applications were different requirements are needed within the reading area. In other words, adjustments always have an effect on the line-shaped receiver as a whole, so that different illumination requirements, distances or the like in the direction of the line, i.e. across the width of the conveyor belt, can at best be considered on average. Finally, the weight of the known systems is extremely high due to a larger number of interfaces and connections, for example about 20 kg for the camera and its associated illumination unit.

It is therefore an object of the invention to provide a camera-based code reader that is simple in design and flexible to use. At the same time, manufacturing is to be facilitated.

This object is satisfied by a camera-based code reader having an image sensor comprising a line-shaped reading area for capturing an image line, an illumination unit for illuminating the reading area, an evaluation unit configured to compose an image from successively captured image lines, and a decoding unit for locating and decoding code information in the image. The code reader further comprises an elongated base body with a plurality of individual image sensors mounted thereon, each of the individual image sensors comprising a line-shaped individual reading area, and the individual image sensors together forming the image sensor by being oriented and arranged relative to one another so that the individual reading areas overlap to form the line-shaped reading area.

The object is also satisfied by a method for manufacturing an adjusted camera-based code reader having an image sensor for capturing an image line in a line-shaped reading area, an illumination unit for illuminating the reading area, an evaluation unit for composing an image from a plurality of image lines, and a decoding unit for locating and decoding code information in the image. At least one circuit board of the illumination unit with a plurality of illumination elements is mounted directly on an elongated base body, and a plurality of individual image sensors each having a line-shaped individual reading area are mounted on the base body, while the illumination unit is activated, in an orientation and arrangement where the individual reading areas overlap to form the line-shaped reading area so that the reading area captures the area illuminated by the illumination unit, the individual image sensors thus commonly forming the image sensor.

The invention starts from the basic idea that the common high-resolution image sensor is replaced by several simpler image sensors with a smaller detection area. Thus, the image sensor is modular.

The invention has the advantage that by the modular design virtually any length of a line-shaped reading area can be achieved. The single, expensive line-shaped receiver is replaced by several individual images sensors that also together are significantly less costly. Due to its modular design, the system is scalable and can highly flexibly be adapted to different applications. At the same time, different settings for the individual images sensors are possible, further increasing flexibility. Because several cameras are advantageously distributed, instead of using a single camera, the v-shaped detection area per camera has a limited angle of aperture. This has considerable advantages against shadowing effects, and therefore results in an improved image quality.

The evaluation unit is preferably configured to compose an image line from image data of the individual image sensors. Here and in the following, preferably refers to embodiments having preferred, but optional features. Composing the image line can for example be done by hard coding or in software. The individual image sensors each have individual reading areas which are in themselves line-shaped, but shorter than the total width to be detected. The superposition of the individual reading areas is preferably not free of overlap. The redundant image information in the overlapping areas can be used by the evaluation unit to stitch the image data when composing the image line in a proper manner.

It should be noted that the evaluation thus preferably provides two distinct functions for the composition of image data. On the one hand, from different sections of the reading area which are detected by the individual image sensors a respective common image line is formed. On the other hand, the image lines captured sequentially are stitched to the two-dimensional image. In a preferred application, where the objects bearing codes are conveyed past a code reader mounted stationary, the objects are thus scanned and captured line-wise in several overlapping individual reading windows. The decoding unit subsequently locates code information in the two-dimensional image and decodes the code information.

The individual image sensors preferably comprise a plurality of pixel elements arranged in a line. Thus, the individual image sensors each form a line camera. Usually, exactly one line of pixel elements is provided. However, a plurality of parallel pixel lines is also possible. As long as the number of pixels in line direction is significantly larger than the number of pixel lines, for example several hundred pixels in line direction versus one to ten pixel lines, the resulting reading area remains line-shaped.

The individual image sensors preferably comprise a plurality of pixel elements arranged in a matrix, wherein the evaluation unit is configured to select a subset of the pixel elements arranged in a line during a teach mode, and to use only image data from the selected pixel elements during operation. On a hardware level, the individual image sensors of this embodiment are matrix cameras rather than line cameras. Effectively, upon completion of the teach process, line cameras are obtained because only the pixel elements as taught are actually used. However, the orientation and position of the line can be varied within the limits of the matrix on an electronic level, so that a substantial part of the adjustment and alignment is shifted from a mechanical procedure to an electronic teach mode which is considerably more flexible and easier to handle. As explained in the previous paragraph, instead of a single line, a plurality of parallel lines can also be taught, which still effectively form a line camera. The orientation of the line is preferably in accordance with the given matrix structure, i.e. part of a line or an entire line of the matrix is selected. In this case, image data can be read out easier and faster. In principle, the line can also be a column of the matrix or even run with an angle to the matrix structure.

The individual image sensors are preferably mounted on the base body with an equal spacing to one another so that the lines of the pixel elements or the selected pixel elements of an individual image sensor form a common line. Such uniform arrangement makes it easier to cover the desired reading area.

The illumination unit preferably comprises a circuit board having a plurality of illumination elements, in particular LEDs, wherein the circuit board is directly mounted on the base body. The illumination elements are preferably associated with a respective individual image sensor. This can for example be achieved by assigning a respective circuit board with illumination elements to an individual image sensor. Hence, the illumination unit is also modular. The illumination elements preferably form one or more lines in line direction of the reading area.

The illumination unit preferably comprises anamorphotic transmission optics, in particular at least one cylindrical lens, to focus the light onto the line-shaped reading area. A line-shaped illumination area is therefore generated which ideally exactly corresponds to the reading area .The available illumination power is optimally used.

The illumination unit preferably comprises at least one adjustable optical element, in particular a movable mirror, to align the area illuminated by the illumination unit with the line-shaped reading area. In this embodiment, the illumination unit can be adjusted to the light receiver. This makes it possible to mount the light receiver without needing a separate adjustment step. Adjustment or alignment of the illumination unit is done by adjustable optics which for example comprise a mirror system with a pivotable mirror and a fixed mirror. The transmission beam is folded, thus enabling a particularly compact arrangement. The pivotable mirror can also be mounted on the base body with its bearing point or bearing points. Because the mirrors only have an effect on the transmission beam, thus do not have any impact on a high-quality imaging for the image capturing, simple mirrors of relatively low surface quality can be used.

The individual image sensors preferably each comprise focusable reception optics. The individual image sensors can thus capture sharp image data from different distances. In particular, the reception optics comprise a tube running through the base body. Openings of the tube are then preferably aligned with the illumination elements to form a line arrangement.

The reception optics preferably comprise an autofocus unit having an optical element on a lever, in particular a mirror, wherein by pivoting the lever, the back focal length or focal length of the reception optics is variable, and wherein the lever is mounted directly on the base body on its bearing point or bearing points. This autofocus unit in its basic concept may correspond to EP 1 742 168 or EP 1 597 228 discussed in the introduction. Thereby, the focus position can be varied very fast and for a particularly large number of focusing cycles. By mounting the lever of the autofocus unit directly on the base body, strong requirements for the accuracy of adjustment or alignment can be satisfied with minimal effort.

The evaluation unit is preferably configured to individually set the focus of the reception optics. The possibility of different settings for the individual image sensors is another advantage of the modular constitution compared to a single line receiver. In principle, additional differences are possible, for example in the reception optics, the sensitivity, or the like.

The evaluation unit is preferably configured to set the focus based on a predetermined height profile. The height profile may for example be configured, taught, or detected by a further upstream sensor. The different focussing of the individual image sensors adapted to a height profile enables reading from objects with an oblique orientation to the code reader, or an oblique mounting of the code reader, of objects having a height contour within the reading line, or of several objects of different height conveyed side-by-side. Generally speaking, despite an existing height contour within the reading line, i.e. usually a height contour transverse to the conveying direction, a sharp image is captured. A single line camera would have to work with a single focus setting in this situation, and as soon as the height differences exceed the depth of field, parts of the code information could be missed.

The base body is preferably made as a heat sink. For example, the base body provides cooling plates. The base body thus has a dual function as a carrier for the camera and illumination on the one hand and as cooling for the complete system on the other.

The manufacturing method according to the invention, for example as exemplified in claim 20, considerably facilitates the adjustment. The illumination is simply mounted on the base body. In a single mounting and adjustment step, the individual image sensors can subsequently be mounted with the correct adjustment and alignment controlled by the activated illumination. Manufacturing is simpler, less expensive, and at the same time provides highest adjustment and alignment accuracy.

Respective focusable reception optics are preferably set through an opening of the base body to be arranged between the illumination elements in front of each individual image sensor. The reception optics are stably supported by the base body and detect the illumination area generated by the illumination elements without interference.

The code reader is preferably adjusted in a distance direction by teaching a focus table comprising the required focus setting in dependence on the distance. In a Z-direction, the adjustment can thus be achieved without the need for any mechanical steps.

The illumination unit is preferably aligned with the line-shaped reading area by adjusting an adjustable optical element or a movable mirror of the illumination unit. No adjustment or alignment of the light receiver is thus required.

In a preferred embodiment, individual image sensors comprising a plurality of pixel elements arranged in a line and are mounted on the base body with an equal spacing from one another so that the pixel elements of all individual image sensors form a common line. Due to the adjusted mounting, the individual reading areas superimpose to a common line-shaped reading area, which corresponds to the adjustment in the X- and Y-direction.

The individual image sensors in a preferred alternative comprise a plurality of pixel elements arranged in a matrix, wherein, while the illumination unit is activated, those pixel elements are selected which receive illumination light from the reading area, and wherein the evaluation unit stores the selected pixel elements in order to use only image data from the selected pixel elements during operation. Mounting of the matrix-shaped individual image sensors needs to be done with only a rough adjustment. The actual adjustment or alignment in the X- or Y-direction is achieved by the electronic teaching of the respective active pixel elements. A mechanical adjustment or alignment is therefore not required.

Figure 2:
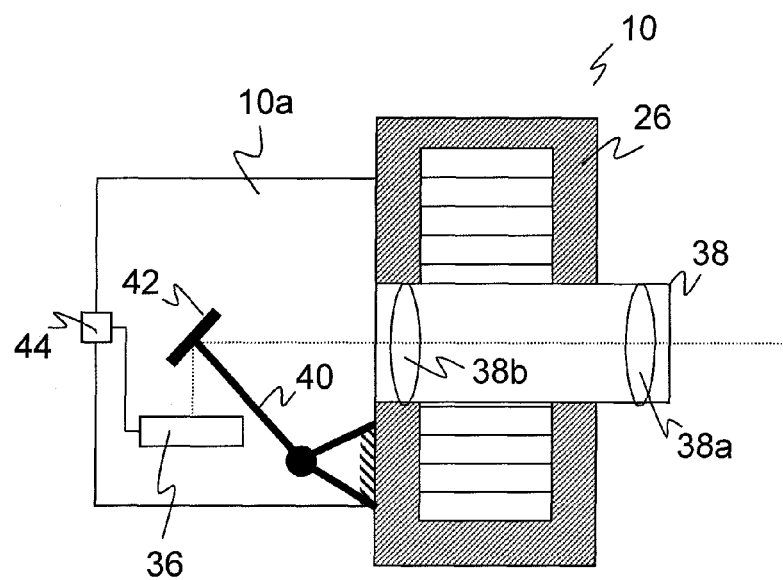
Figure 3:
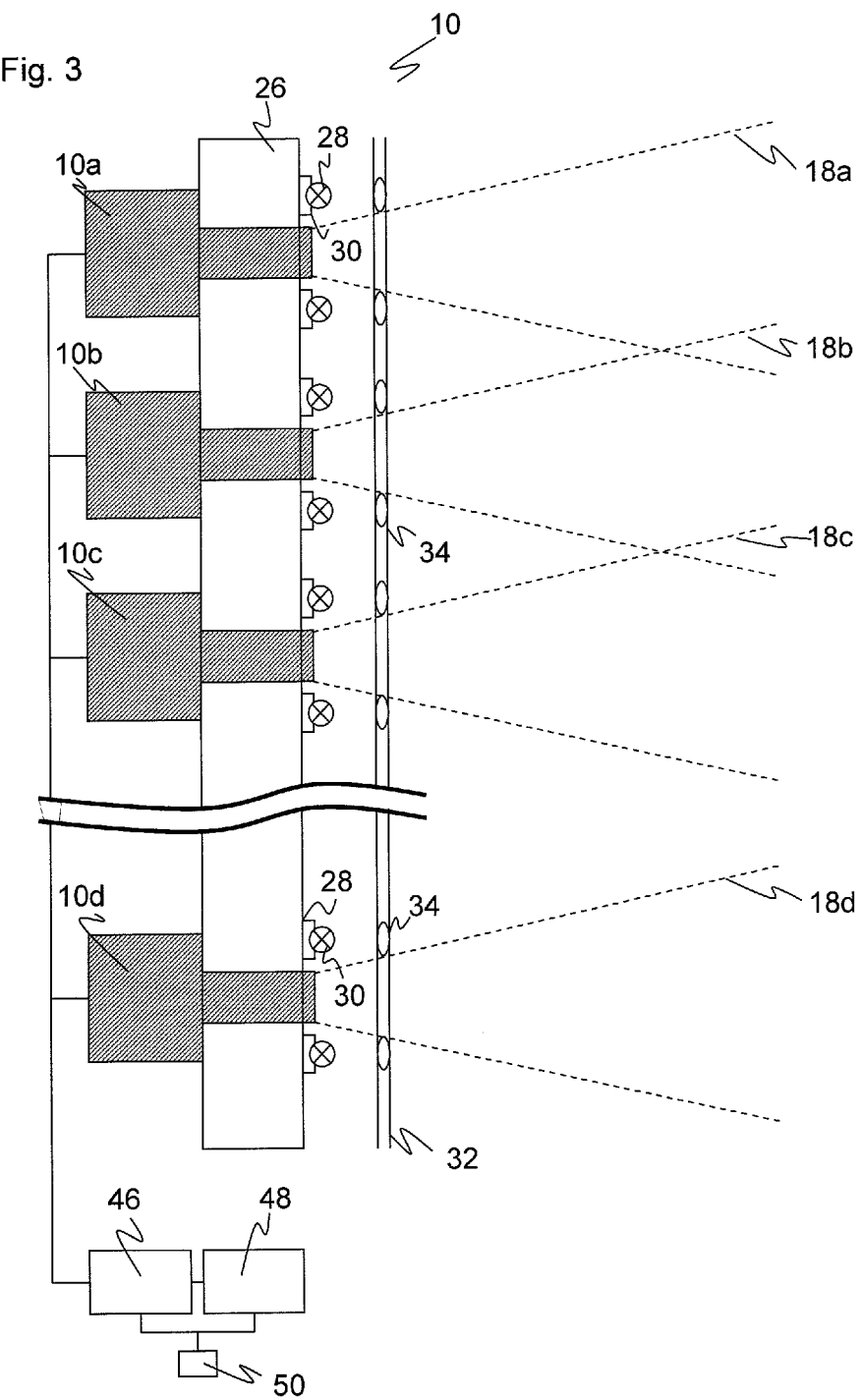
Figure 4:
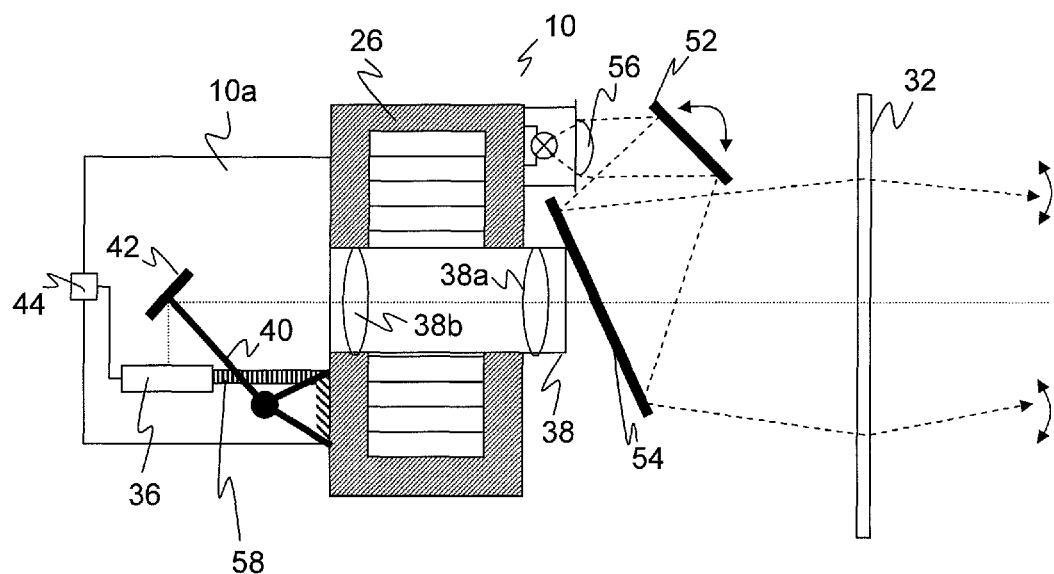

The invention is explained in more detail also in view of further features and advantages based on exemplary embodiments and with reference to the drawings. The Figures show in:

FIG. 1 a schematic three-dimensional overview of a camera-based code reader with a line-shaped reading area above a conveyor belt conveying objects bearing codes to be read;

FIG. 2 a cross section through a base body and a camera module of the code reader according to FIG. 1;

FIG. 3 a longitudinal section through the base body and the camera modules of the code reader according to FIG. 1; and FIG. 4 a representation of a further embodiment with an adjustable illumination unit.

FIG. 1 shows a code reader 10 mounted above a conveyor belt 12 conveying objects 14, as indicated by an arrow 16, through a detection area 18 of the code reader 10. The objects 14 bear code areas 20 on their outer surfaces. The task of the code reader 10 is to identify the code areas 20, to read and decode the codes therein, and to assign them to the respective object 14.

The code areas 20 can only be detected by the code reader 10 if they are attached on the top surface or at least visible from above. In contrast to the illustration in FIG. 1, a plurality of code readers 10 can be mounted from different directions for reading a code 22 attached to the side or bottom, thus enabling a so-called omni reading from all directions. In practice, the plurality of code readers in a reading system is often provided in a reading tunnel.

The detection area 18 of the code reader 10, as illustrated in FIG. 1, is a single plane and no three-dimensional spatial section. Consequently, a line-shaped reading area of the code reader 10 results. By line-wise capturing the objects 14 in the conveyor direction 16, an overall image of the conveyed objects 14 including the code areas 20 is successively generated. The stitching or composing of an overall image is relatively easy for a uniform conveying of the objects 14 in a stationary arrangement, in particular if the conveyor provides position or speed measurement data. In this case, it is not even necessary to apply involved intelligent algorithms locating connection areas or eliminating redundant image regions. However, such algorithms may of course be added, if required. The sensor 10 can also be a mobile device which is moved passed the area to be read.

Upstream the code reader 10, against the conveyor direction 16, a further sensor 24, for example a distance-measuring laser scanner, is optionally provided which is connected to the code reader 10. The sensor 24 detects the height contour of the objects 14, in particular also line by line. This information is forwarded to the code reader 10 and can be used to detect objects 14 as individual objects, to mark regions of the conveyor belt 14 without objects 14 as uninteresting from the outset, or to vary focus settings.

Based on a cross section shown in FIG. 2 and a longitudinal section shown in FIG. 3, the modular structure of code reader 10 will now be explained in more detail. The code reader 10 comprises an elongated base support or base body 26. On one side of the base body 26, several camera modules 10a-d are mounted, and on the other side of the base body 26, electronic cards or circuit boards 28 with illumination elements 30 are mounted as modular illumination units.

Transmission optics 32 are arranged in front of the illumination units 28, 30, the transmission optics 32 optionally being connected with the base body 26 by spacing elements which are not shown, or in another optional alternative being supported by a housing. Some exemplary lenses 34 are shown in FIG. 3 in the transmission optics purely for the sake of illustration. The transmission optics 32 as a whole form anamorphotic optics, focusing light in a direction transverse to the plane of the paper and homogenizing the light in a direction illustrated vertically. The construction of such transmission optics is known per se, and the invention is not restricted to the shown example with one cylindrical lens per illumination element 30.

Each camera module 10a-d comprises a spatially resolving light receiver 36 with a line-shaped reading area, for example a CCD or a CMOS chip having a plurality of light sensitive pixel elements. Receiving optics 38 with a tube are placed through an opening of the base body 26 so that the receiving opening is arranged between the illumination elements 30 and, together with the illumination elements 30, forms a linear arrangement across the longitudinal extent of the base body 26. FIG. 2 shows two lenses 38a-b as elements of the receiving optics 38 purely by way of example. Alternatively, any objective design with more or less lenses and other optical elements is also possible.

An autofocus unit with a lever 40 is disposed between the reception optics 38 and the light receiver 36. The lever 40 on its one end comprises a mirror 42, and is pivotably mounted on its other end, wherein the support with the pivot is mounted on the base body 26. Upon pivotal movement of the lever 40, the position and orientation of the mirror 42 is varied, so that the light path of the reception light from the receiving optics via the mirror 42 to the light receiver 36 is prolonged or shortened. The optically effective back focal length is thus varied to adjust the focus position. The mirror 42 can also be made as a concave mirror, thus also influencing the focal length of the reception optics.

The light receivers 36 of each camera module 10*a-d* capture image data from their respective detection area 18*a-d* which are output via an output 44. The detection areas 18*a-d* overlap and together form a line-shaped reading area which can assume virtually any length through the number of camera modules 10*a-d*.

The image data of the individual camera modules 10*a-d* are fed to an evaluation unit 46. By means of image processing algorithms, or by using knowledge of the geometrical arrangement and distances of the light receivers 36, respectively, the partial image lines or image sections which are provided by each individual camera module 10*a-d* are composed to a common image line. With the motion of the objects 14 relative to the code reader 10, a plurality of such image lines is successively detected and processed to a two-dimensional image. The two-dimensional image is thus twofold composed or stitched: a common image line across the width of the conveyor belt 12 is generated from image data of the plurality of light receivers 36, and a two-dimensional image is composed of a plurality of common image lines.

A decoding unit 48 receives such a two-dimensional image either cyclically or at certain time intervals, identifies code areas 20, and reads the code information from the code areas 20. Subsequently, the decoded code information is output at an output 50 of the code reader 10.

In the illustrated embodiment, there is a common internal evaluation unit 46 and decoding unit 48 of the code reader 10. This is to be understood purely as an example. The evaluation and decoding tasks can also be distributed differently in many ways. For example, each camera module 10*a-d* may comprise a separate evaluation unit which performs pre-processing and controls the pivotal movements of the lever 40 for focusing. It is furthermore conceivable that only the evaluation unit 46 is part of the code reader 10 to generate two-dimensional images, which are output as a whole or only in interesting parts (ROI, region of interest) via the output 50. Then, the decoding is carried out externally. It is also possible to output the raw, unprocessed image data of the light receivers 36, so that the stitching or composing of image lines or of two-dimensional images and the decoding is done externally. In a similar manner, other distributions of evaluation tasks between the camera modules 10*a-d*, code reader 10, and external systems are possible. It should be noted for clarification that the evaluation unit may also perform control tasks, like focus adjustments or controlling of activity and intensity of the illumination unit 28, 30.

The base body 26 forms a central mounting base for the camera modules 10*a-d*, the illumination units 28, 30 as well as housing parts which are not represented, wherein the housing parts may be simple sheet metal parts. The base body 26 may also comprise cooling plates, cooling fins are the like and thus be made as a central device cooling. This eliminates the interface between camera and illumination commonly required, and also their mutual adjustment or alignment.

The adjustment or alignment is considerably simplified by the structure and constitution of the code reader 10 and the base body 26. The circuit board 28 of the illumination unit with the illumination elements 30 is positioned directly or indirectly via very exact supports on the base body 26. The camera modules 10*a-d* and the lever 40 of the respective autofocus units are also mounted directly on the base body 26. Immediately with the mounting, the adjustment is achieved by aligning the reading areas of the light receivers 36 and the illumination area of the activated illumination unit 28, 30. This guarantees a high adjustment and alignment accuracy of the camera modules 10*a-d* with respect to the illumination unit 28, 30 in just one adjustment step.

Due to the direct mounting and adjustment on the base body 26, a plurality of camera modules 10*a-d* can be combined at very low cost in this arrangement. Each camera module 10*a-d* detects its own reading area, and the image data are subsequently combined by image processing (image stitching).

A particular advantage of the plurality of camera modules 10*a-d* is the possibility to adjust the individual autofocus units with the levers 40 differently. This allows the focus to follow a height profile in the common line-shaped reading area so that also a height contour can be sharply imaged in all parts. This leads to an increased image quality and thus reading quota, or it makes applications accessible in the first place where the object contours within the reading area are not sufficiently flat. The height contour can be preset or be measured by the sensor 24 during operation.

A matrix receiver having a plurality of pixels arranged in a matrix can be used as an alternative for a pixel line. This has the advantage that no mechanical alignment is necessary. The matrix receiver is mounted only approximately in its ideal position with the tolerances of the components. The associated receiving optics 38 are mounted according to a mechanical stop. In a Z-direction, i.e. the distance direction or the direction along the optical axis of the receiving optics 38, the required setting of the autofocus unit, i.e. the pivoting of the lever 40, is taught via a focusing table. In the orthogonal X- and Y-directions, the position of the illumination area is taught on the matrix receiver with activated illumination unit 28, 30. During operation, only the taught pixels are used, which effectively correspond to an ideally aligned pixel line.

Instead of a line, also several adjacent lines can be taught and be used for the evaluation in the described manner. This still results in an elongated, rectangular and thus line-shaped reading area. The illumination area should be correspondingly broad.

In a particularly cost-effective embodiment, standard cameras may be mounted with the autofocus units as an alternative for the camera modules 10*a-d* as described with reference to FIGS. 2 and 3.

FIG. 4 shows a representation of another embodiment of a code reader 10. In all Figures, the same reference symbols refer to the same or corresponding features. In this embodiment, an optical adjustment or alignment system is assigned to the illumination units 28, 30, only a few of which are exemplarily shown. A pivotable mirror 52 and a fixed mirror 54 fold the transmission beam, wherein the position of the resulting illumination area can be varied by pivoting pivotable mirror 52. The pivot movement of the pivotable mirror 52 and the resulting change in position of the illumination area are indicated by double arrows in FIG. 4.

Primary transmission optics 56 for beam collimation as well as the secondary transmission optics 32 already known from FIG. 3 for generating a line-shaped illumination area are associated with the illumination unit 28, 30. The specific design of the optical elements 32, 52, 54, 56 of the transmission path is to be understood purely as an example. The primary transmission optics 56 may be dispensed with, or additional mirrors, lenses, or other optical elements for guiding and shaping of light beams may be used. It should also be noted that, due to one dimension perpendicular to the plane of the paper missing in the two-dimensional illustration, there are apparent overlaps for example of the fixed mirror 54 and the visual field of the receiving optics 38.

In the embodiment according to FIG. 4, the light receiver 36 may be mounted without any adjustment or alignment. The position of the light receiver 36 with respect to the base body 26 is mechanically preset by a mechanical stop 58 for example of the housing or the circuit board of the light receiver 36. The illumination units 28, 30 are aligned with the receiving unit comprising the light receiver 36. Generally, the circuit board 28, the illumination units 30, the primary transmission optics 56 and/or the secondary transmission optics 32 can laterally be moved.

In the embodiment represented in FIG. 4, pivotable mirror 52 is pivoted for adjusting the illumination units 28, 30 until the illuminated area corresponds to the reading area of the light receiver 36. This embodiment has the additional advantage that a very compact design is possible by a pure beam folding. Nevertheless, the illumination units 30 are directly linked to the base body 26 and can thus be easily mounted and be cooled by heat dissipation through the base body 26. Since only the transmission beam is guided via the mirrors 52, 54, their surface quality is not relevant for the reception path and thus image quality, so that comparably simple and inexpensive mirror elements can be used.

It is both possible to assign a common optical alignment or adjustment system to all illumination units 28, 30, and to provide several optical alignment or adjustment systems, in particular small mirrors, to individual or groups of illumination units 28, 30.

The invention claimed is:

1. A camera-based code reader (10), comprising:
   an elongated base body (26) with a plurality of individual image sensors (32) mounted thereon, each of the plurality of individual image sensors (32) comprising a line-shaped individual reading area (18a-d) and being oriented and arranged relative to one another so that the individual reading areas (18a-d) overlap to form a line-shaped reading area (18), and wherein each of the plurality of individual image sensors (32) is configured to capture image data in the form of partial image lines of the respective line-shaped individual reading areas (18a-d),
   an evaluation unit (46) configured to compose a common image line from the image data of the partial image lines captured by the individual image sensors (32), and
   a decoding unit (48),
   wherein the plurality of individual image sensors (32) are further configured to capture successive partial images, and the evaluation unit (46) is further configured to compose the successive partial images into successive common line images and to compose an image from the successive common image lines, and
   wherein the decoding unit (48) is configured for locating and decoding code information in the image.

2. The code reader (10) according to claim 1, wherein the plurality of individual image sensors (32) comprise a plurality of pixel elements arranged in a line.

3. The code reader (10) according to claim 2, wherein the plurality of individual image sensors (32) are mounted on the elongated base body (26) with an equal spacing to one another so that lines of pixel elements of the plurality of individual image sensors (32) form a common line.

4. The code reader (10) according to claim 1, wherein the plurality of individual image sensors (32) comprise a plurality of pixel elements arranged in a matrix, and wherein the evaluation unit (46) is configured to select a subset of the pixel elements arranged in a line during a teach mode, and to use only image data from the selected subset of the pixel elements during operation.

5. The code reader (10) according to claim 4, wherein the plurality of individual image sensors (32) are mounted on the elongated base body (26) with an equal spacing to one another so that lines of the selected pixel elements of an individual image sensor (32) form a common line.

6. The code reader (10) according to claim 1, wherein the illumination unit (28, 30) comprises a circuit board (28) having a plurality of illumination elements (30), and wherein the circuit board (28) is directly mounted on the elongated base body (26).

7. The code reader (10) according to claim 6, wherein the illumination elements (30) are LEDs.

8. The code reader (10) according to claim 1, wherein the illumination unit (28, 30) comprises anamorphotic transmission optics (32) to focus light onto the line-shaped reading area (18).

9. The code reader (10) according to claim 8, wherein the anamorphotic transmission optics comprise at least one cylindrical lens (34).

10. The code reader (10) according to claim 1, wherein the illumination unit (28, 30) comprises at least one adjustable optical element (52) to align an area illuminated by the illumination unit (28, 30) with the line-shaped reading area.

11. The code reader (10) according to claim 10, wherein the optical element (52) comprises a movable mirror.

12. The code reader (10) according to claim 1, wherein the plurality of individual image sensors (32) each comprise focusable reception optics (38, 40, 42).

13. The code reader (10) according to claim 12, wherein the focusable reception optics (38, 40, 42) comprise a tube running through the elongated base body (26).

14. The code reader (10) according to claim 12, wherein the focusable reception optics (38, 40, 42) comprise an autofocus unit (40, 42) having an optical element (42) on a lever (40), wherein by pivoting the lever (40), a back focal length or a focal length of the reception optics (38, 40, 42) is variable, and wherein the lever (40) is mounted directly on the elongated base body (26) a bearing point or bearing points of the elongated base body (26).

15. The code reader (10) according to claim 14, wherein the optical element (42) is a mirror.

16. The code reader (10) according to claim 12, wherein the evaluation unit (48) is configured to set the focus of the reception optics (38, 40, 42) individually.

17. The code reader (10) according to claim 16, wherein the evaluation unit (48) is configured to set the focus based on a predetermined height profile.

18. The code reader (10) according to claim 1, wherein the elongated base body (26) is made as a heat sink.

19. A method for manufacturing an adjusted camera-based code reader (10), comprising:
   mounting at least one circuit board (28) of an illumination unit (28, 30) with a plurality of illumination elements (30) on an elongated base body (26),
   mounting a plurality of individual image sensors (32) each having a line-shaped individual reading area (18a-d) on an elongated base body (26),
   activating the illumination unit (28, 30), and orienting and arranging the the line-shaped individual reading areas (18a-d) to overlap and form a line-shaped reading area (18) so that the line-shaped reading area (18) captures an area illuminated by the illumination unit (28, 30),
   configuring each of the plurality of individual image sensors (32) to capture image data in the form of partial image lines of the respective line-shaped individual reading areas (18a-d), configuring an evaluation unit (46) to compose a common image line from the image data of the individual image sensors (32), and configuring the plurality of individual image sensors (32) to capture successive partial images, and the evaluation unit (46) to compose the successive partial images into successive common line images and to compose an image from the successive common image lines, and configuring a decoding unit (48) for locating and decoding code information in the image.

20. The method according to claim 19, wherein focusable reception optics (38, 40, 42) are set through an opening of the elongated base body (26) to be arranged between the illumination elements (30) in front of each of the plurality of individual image sensors (32), and wherein the code reader (10) is adjusted in a distance direction by teaching a focus table comprising the required focus setting in dependence on a distance along the distance direction.

21. The method according to claim 19, wherein the illumination unit (28, 30) is aligned with the line-shaped reading area by adjusting an adjustable optical element (52) or a movable mirror of the illumination unit (28, 30).

22. The method according to claim 19, wherein the plurality of individual image sensors (32) comprise a plurality of pixel elements arranged in a line and are mounted on the elongated base body (26) with an equal spacing from one another so that the pixel elements of all individual image sensors (32) form a common line.

23. The method according to claim 19, wherein the plurality of individual image sensors (32) comprise a plurality of pixel elements arranged in a matrix, and wherein, while the illumination unit (28, 30) is activated, those pixel elements are selected which receive illumination light from the line-shaped reading area (18), and wherein the evaluation unit (46) stores the selected pixel elements in order to use only image data from the selected pixel elements during operation.

* * * * *